United States Patent
Guo (10) Patent No.: US 8,761,754 B2
(45) Date of Patent: Jun. 24, 2014

(54) METHOD AND APPARATUS FOR DATA TRANSMISSION BASED ON COORDINATED MULTIPLE POINT TRANSMISSION

(75) Inventor: Yang Guo, Shenzhen (CN)

(73) Assignee: ZTE Corporation (CN)

( * ) Notice: Subject to any disclaimer, the term of this patent is extended or adjusted under 35 U.S.C. 154(b) by 335 days.

(21) Appl. No.: 13/378,644

(22) PCT Filed: Mar. 23, 2010

(86) PCT No.: PCT/CN2010/071201
§ 371 (c)(1),
(2), (4) Date: Dec. 15, 2011

(87) PCT Pub. No.: WO2010/145236
PCT Pub. Date: Dec. 23, 2010

(65) Prior Publication Data
US 2012/0087440 A1    Apr. 12, 2012

(30) Foreign Application Priority Data

Jun. 15, 2009   (CN) .......................... 2009 1 0108074

(51) Int. Cl.
| | | |
|---|---|---|
| H04W 4/00 | (2009.01) | |
| H04B 7/06 | (2006.01) | |
| H04B 7/02 | (2006.01) | |
| H04W 48/18 | (2009.01) | |
| H04W 24/02 | (2009.01) | |
| H04L 5/00 | (2006.01) | |
| H04L 25/02 | (2006.01) | |
| H04W 24/10 | (2009.01) | |
| H04L 1/06 | (2006.01) | |

(52) U.S. Cl.
CPC .............. *H04B 7/024* (2013.01); *H04W 48/18* (2013.01); *H04B 7/0621* (2013.01); *H04W 24/02* (2013.01); *H04L 5/0035* (2013.01); *H04L 25/0248* (2013.01); *H04B 7/0617* (2013.01); *H04B 7/0689* (2013.01); *H04L 5/0048* (2013.01); *H04L 5/0057* (2013.01); *H04W 24/10* (2013.01); *H04L 25/0204* (2013.01); *H04L 25/0228* (2013.01); *H04L 1/0625* (2013.01)
USPC ....................................... 455/422.1

(58) Field of Classification Search
CPC .... H04B 7/024; H04B 7/0617; H04B 7/0689; H04B 7/617; H04W 24/02; H04W 8/18; H04W 48/18
USPC ................... 455/561, 446, 422.1; 375/295
See application file for complete search history.

(56) References Cited

U.S. PATENT DOCUMENTS

| 6,449,641 | B1 * | 9/2002 | Moiin et al. |
| 2003/0040317 | A1 * | 2/2003 | Fattouch |
| 2006/0268791 | A1 * | 11/2006 | Cheng et al. |
| 2010/0040006 | A1 * | 2/2010 | Caire |
| 2010/0041407 | A1 * | 2/2010 | Caire et al. |
| 2010/0056215 | A1 * | 3/2010 | Gorokhov et al. |

FOREIGN PATENT DOCUMENTS

| CN | 101325741 A | 12/2008 |
| CN | 101373999 A | 2/2009 |
| WO | 2008115023 A1 | 9/2008 |

OTHER PUBLICATIONS

Zhang, Jian, Authorized officer, The State Intellectual Property Office, P.R. China / International Searching Authority, International Search Report, International Application No. PCT/CN2010/071201; search date: Jun. 21, 2010; mail date: Jul. 1, 2010.
Lun Dong and Chia-Chin Chong, Inventors, "A Practical Protocol for Base Station Cooperation in Cellular Networks", ip.com Prior Art Database, Apr. 1, 2009, 21 pages.

* cited by examiner

*Primary Examiner* — Melody Mehrpour
(74) *Attorney, Agent, or Firm* — Kolisch Hartwell, P.C.

(57) ABSTRACT

The present invention provides a method and an apparatus for transmitting data based on coordinated multiple point transmission and reception. The method includes: a transmitting point pre-configuring at least two coordinated multiple point transmission and reception policies; and the transmitting point determining a channel quality value of every cell according to received signals of multiple cells participating in coordinated transmission and reception; and selecting a corresponding coordinated multiple point transmission and reception policy according to the channel quality value of the cell, and transmitting a data stream to a receiving end according to the corresponding coordinated multiple point transmission and reception policy. In the present invention, when the channel quality is relatively poor, various cell participating in the coordinated multiple point transmission and reception transmit the same one data stream to ensure the data transmission and reception quality.

18 Claims, 3 Drawing Sheets

METHOD AND APPARATUS FOR DATA TRANSMISSION BASED ON COORDINATED MULTIPLE POINT TRANSMISSION

TECHNICAL FIELD

The present invention relates to the Multiple Input and Multiple Output (MIMO) mobile communication system, and specifically, to a method and an apparatus for transmitting data based on coordinated multiple point transmission and reception.

BACKGROUND OF THE RELATED ART

In order to meet the performance indexes of Long Term Evolution (LTE) technique and the subsequent Long Term Evolution Advanced (LTE-A) of 3G, and especially, meet the performance requirements of the LTE-A for the cell edge users, the Coordinated Multiple Point (CoMP) technique is introduced. The CoMP technique is regarded as one of important techniques that are able to improve the performance of cell edge users and suppress the inter cell interference effectively. The CoMP technique could not only make the resources occupied by cell edge users orthogonal to each other by the coordination among base stations, but also use multiple cells to unify to transmit and receive signals for target users, thereby using the space resources to implement the dual performance of eliminating interference and enhancing link performance and capacity.

The 3GPP Ran1 meeting #53 proposes that the CoMP transmission and reception should be included in framework of the LET-A. A series of CoMP schemes is proposed in the subsequent meetings #54, #54bis and #55.

In the discussion process of the present 3GPP LTE-A research stage, the implementation schemes of the CoMP technique are basically classified into two kinds as follows:
1. multiple points coordinated scheduling/beam-forming;
2. multiple points joint coordinated transmission and reception/joint processing.

The major difference between the above two schemes is in whether the base stations share the data information of users or not. Herein, the first implementation scheme mentioned above refers to the first kind CoMP, and the second implementation scheme mentioned above refers to the second kind CoMP. In the first kind CoMP, the data information of users is not shared among the base stations participating in the coordination, only the main serving base station of the user performs data communication with the user, and various coordinated base stations share the channel information and distribution information and so on of each user and perform joint scheduling based on the information. The beam-forming technique is an important technique for improving the utilization ratio of cell edge spectrum and reducing the inter-cell interference. With regard to the second kind CoMP, the base stations participating in the coordination share the data, channel and scheduling information and the like, and jointly serve the target users.

Although two implementation schemes of the CoMP technique are given, there is not correspondingly provided a scheme for transmitting data based on the coordinated multiple point transmission and reception so far.

SUMMARY OF THE INVENTION

In the view of the above-mentioned background of the related art, the present invention provides a method and an apparatus for transmitting data based on coordinated multiple point transmission and reception, which are able to further improve the performance of data transmission and reception in the scenario of coordinated multiple point transmission and reception.

In order to solve the above-mentioned technical problem, the present invention adopts a technical scheme as follows.

A method for transmitting data based on coordinated multiple point transmission and reception comprises:

a transmitting point pre-configuring at least two coordinated multiple point transmission and reception policies; and the transmitting point determining a channel quality value of every cell according to received signals of multiple cells participating in coordinated transmission and reception; and selecting a corresponding coordinated multiple point transmission and reception policy according to the channel quality value of the cell, and transmitting a data stream to a receiving end according to the corresponding coordinated multiple point transmission and reception policy.

The coordinated multiple point transmission and reception policies pre-configured include a first coordinated multiple point transmission and reception policy and a second coordinated multiple point transmission and reception policy;

wherein the first coordinated multiple point transmission and reception policy refers that all of the data streams transmitted by multiple cells participating in the coordinated transmission and reception are same; the second coordinated multiple point transmission and reception policy refers that not all of the data streams transmitted by multiple cells participating in the coordinated transmission and reception are the same;

the step of transmitting the data stream to the receiving end comprises:

if the channel quality values of at least two cells are greater than a channel quality threshold, transmitting the data stream to the receiving end according to the second coordinated multiple point transmission and reception policy; or else, transmitting the data stream to the receiving end according to the first coordinated multiple point transmission and reception policy.

Beam groups obtained by said cell based on beam-forming is allocated into two layers that are not intersected, and for one receiving end, the beam group of the cell participating in the coordinated transmission and reception is located in a same layer.

A number of cells participating in the coordinated transmission and reception is 3 for one receiving end, wherein the cell with a best channel quality is a main cell, and other cells are coordinated cells; in the second coordinated multiple point transmission and reception policy, the step of transmitting the data stream to the receiving end comprises:

the main cell transmitting a first kind data stream, and every coordinated cell transmitting a second kind data stream.

The main cell and every coordinated cell uses space time block coding or space frequency block coding to transmit the data stream.

The step of transmitting the data stream to the receiving end further comprises: loading equivalent synthetic channel information into a same data stream from the multiple cells participating in the coordinated transmission and reception.

An apparatus for transmitting data based on coordinated multiple point transmission and reception comprises:

a policy pre-configuration module, which is configured to: pre-configure at least two coordinated multiple transmission and reception policies;

a policy selection module, which is configured to: determine a channel quality value of every cell based on received signals of multiple cells participating in coordinated transmission and reception; and selecting a corresponding coordinated multiple point transmission and reception policy according to the channel quality value of the cell; and a data transmission module, which is configured to: transmit a data stream to a receiving end according to the corresponding coordinated multiple point transmission and reception policy.

The policy pre-configuration module is specifically configured to: pre-configured two coordinated multiple point transmission and reception policies, wherein a first coordinated multiple point transmission and reception policy refers that all of the data streams transmitted by multiple cells participating in the coordinated transmission and reception are same; and a second coordinated multiple point transmission and reception policy refers that not all of the data streams transmitted by multiple cells participating in the coordinated transmission and reception are the same;

the policy selection module is specifically configured to: select the second coordinated multiple point transmission and reception policy if the channel quality values of at least two cells are greater than a channel quality threshold; or else, select the first coordinated multiple point transmission and reception policy.

Beam groups obtained by said cell based on beam-forming is allocated into two layers that are not intersected, and for one receiving end, the beam group of the cell participating in the coordinated transmission and reception is located in a same layer.

A number of cells participating in the coordinated transmission and reception is 3 for one receiving end, wherein the cell with a best channel quality is a main cell, and other cells are coordinated cells; in the second coordinated multiple point transmission and reception policy, the data transmission module is specifically configured to: transmit a first kind data stream through the main cell, and transmit a second kind data stream through every coordinated cell.

In the data transmission module, the main cell and every coordinated cell use space time block coding or space frequency block coding to transmit the data stream respectively.

The data transmission module is further configured to load equivalent synthetic channel information into a same data stream from the multiple cells participating in the coordinated transmission and reception.

The present invention pre-configures two coordinated multiple point transmission and reception policies, and selects a corresponding transmission policy to transmit data on the basis of the channel quality value of the cells; when the channel quality is relatively poor, the same one data stream is transmitted to ensure the data transmission and reception quality, and when the channel quality is relatively good, the different data streams are transmitted to increase the data throughput, thereby further improving the data transmission performance.

PREFERRED EMBODIMENTS OF THE PRESENT INVENTION

The specific embodiments of the present invention will be described in detail in combination with the accompanying figures.

Figure 5:
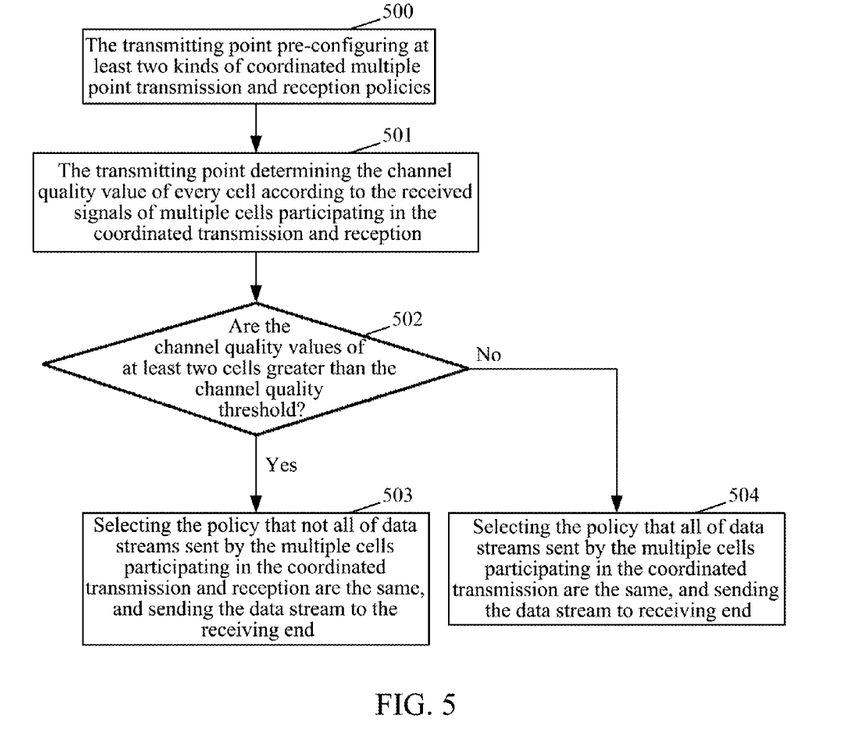
FIG. 5 is a flowchart of the embodiment of the method for transmitting data in accordance with the present invention.

FIG. 5 shows the flowchart of the method for transmitting data provided in accordance of embodiments of the present invention. As shown in FIG. 5, the present invention is mainly on basis of the scenario of CoMP and uses a following method for transmitting data.

Step 500: a transmitting point pre-configures at least two coordinated multiple point transmission and reception policies.

This embodiment illustrates two coordinated multiple point transmission and reception policies including the first coordinated multiple point transmission and reception policy and the second coordinated multiple point transmission and reception policy, wherein the first coordinated multiple point transmission and reception policy refers that all of the data streams transmitted by multiple cells participating in the coordinated transmission and reception are the same; the second coordinated multiple point transmission and reception policy refers that not all of the data streams transmitted by multiple cells participating in the coordinated transmission and reception are the same.

Steps 501-502: the transmitting point determines the channel quality value of each cell based on the received signals of multiple cells participating in coordinated transmission and reception, and determines whether there are the channel quality values of at least two cells exceeding the channel quality threshold, and if yes, step 503 is preformed; or else step 504 is preformed.

Step 503: the transmitting point selects the second coordinated multiple point transmission and reception policy, namely selects the policy that the not all of data transmitted by the multiple cells participating in coordinated transmission and reception are not the same, and transmits the data stream to the receiving end according to the second coordinated multiple point transmission and reception policy; the flow ends.

Step 504: the transmitting point selects the first coordinated multiple transmission and reception policy, namely selects the policy that all of the data transmitted by the multiple cells participating in coordinated transmission and reception are the same, and transmits the data stream to the receiving end according to the first coordinated multiple point transmission and reception policy.

In FIG. 5, the transmitting point generally refers to the base station which transmits data; the receiving end refers to the User Equipment (UE, called the user hereafter) which receives data. The coordinated multiple point transmission and reception adapts to case that the receiving end is located at the edge of the certain cell, and in this case, the receiving end not only receives the signal from the cell where this receiving end is located, but also might receive the signal from adjacent cells. Generally, the signals from these adjacent cells are regarded as interference, however, these interference signals are converted into useful signals to participate in transmitting data to the receiving end in the coordinated multiple point transmission and reception, therefore, these cells that participate in transmitting data are called as cells that participate in the coordinated transmission and reception (including the cells where the receiving end is located and adjacent cells).

Since there are usually multiple cells participating in the coordinated transmission and reception, how do multiple cells transmit data to the receiving end is involved. It can be known from the method of the present invention shown in FIG. 5 that at least two coordinated multiple point transmission and reception policies are pre-configured. In the first coordinated multiple point transmission and reception policy, the same data stream is transmitted by various cells participating in the coordinated transmission and reception, that is to say, only one kind of the data stream is transmitted to the receiving end; however, in the second kind of the coordinated multiple point transmission and reception policy, not all of the data streams transmitted by various cells participating in coordinated transmission and reception are same, that is to say, the data streams transmitted to the receiving end include at least two kinds of data streams, for example, the first kind data stream is transmitted by a part of the cells participating in coordinated transmission and reception, and the second kind data stream is transmitted by the other part of the cells participating in coordinated transmission and reception.

As shown in FIG. 5, the selection of the coordinated multiple point transmission and reception policy in accordance with the present invention is mainly based on the channel quality value of the cell. A channel quality threshold (this channel quality threshold may also be adjusted correspondingly according to actual requirements) may be pre-configured. If the channel quality values of more than two cells exceed the channel quality threshold, the second coordinated multiple point transmission and reception policy is selected, or else, the first coordinated multiple point transmission and reception policy is selected.

With the selection of the CoMP service policy in accordance with the present invention, when the channel quality is relatively poor, the same data stream is transmitted by various cells participating in coordinated transmission and reception, which ensures the data transmission quality; however, when the channel quality is relatively good, different data streams are transmitted by various cells participating in coordinated transmission and reception, which improves the data throughput and enhances the performance of the data transmission and reception.

Figure 1:
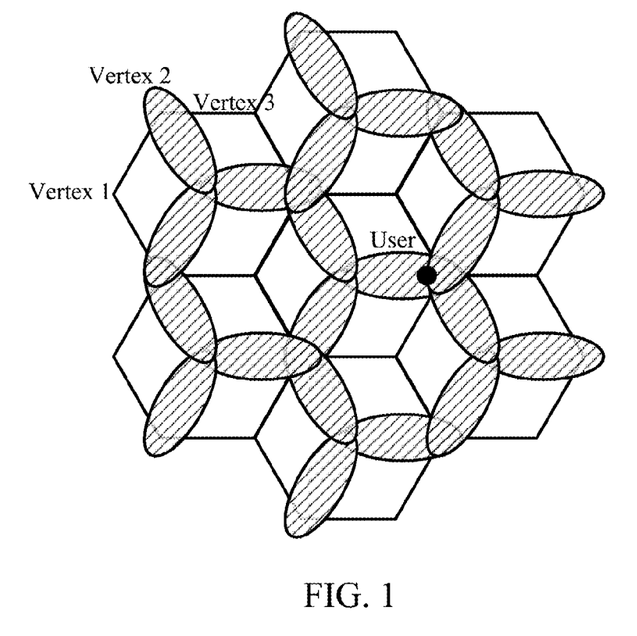
FIG. 1 is schematic diagram of the first layer of beam groups described in accordance with embodiments of the present invention.
Figure 2:
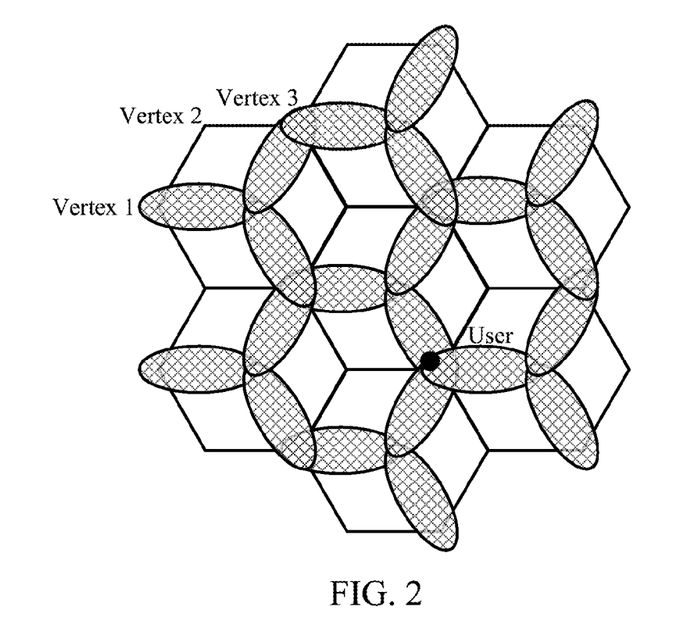
FIG. 2 is a schematic diagram of the second layer of beam groups described in accordance with embodiments of the present invention.

In the existing CoMP implementation schemes, the first kind of implementation schemes is beam-forming. In the present invention, cells participating in coordinated transmission and reception use the way of beam-forming to perform the cell coverage, wherein FIG. 1 is a schematic diagram of the first beam-forming group described in accordance with embodiments of the present invention, and FIG. 2 is a schematic diagram of the second beam-forming group described in accordance with embodiments of the present invention. As shown in FIGS. 1 and 2, a cell may be regarded to cover a hexagonal area theoretically. Generally, with regard to a cell, six beams respectively pointing at six angles of the hexagon from the center of the cell can cover the whole cell. For the sake of convenient description, as shown in FIGS. 1 and 2, the left vertex of two vertexes which are located are middle positions at the horizontal direction of the horizontally placed hexagonal cell shown in the figures is called vertex 1, the vertexes along the clockwise direction are in turn called vertex 2, vertex 3, vertex 4 (i.e. the right vertex in middle positions middle position at the horizontal direction), vertex 5, and vertex 6. According to the embodiment of the present invention, the beam group of the cell may be allocated into two layers, and the layers are not intersected to each other, namely, each beam is allocated into one layer uniquely rather than belonging to two layers. As shown in FIG. 1, the first layer beam group includes the beams that cover the vertex 2, vertex 4, and vertex 6 of the cell. As shown in FIG. 2, the second layer beam group includes the beams that cover the vertex 1, vertex 3, and vertex 5 of the cell, that is, each angle between the beams is 120 degree. The cells participating in coordinated transmission and reception are layered into beam groups in the same way. Therefore, the user located at the edge of a certain cell shown in FIG. 1 is covered by the first layer beam group of three cells; the user located at the edge of a certain cell shown in FIG. 2 is covered by the second layer beam group of three cells, that is, the beam group of the cells participating in coordinated transmission and reception is in the same layer for a certain user.

When transmitting data to a user, the position of the user is first located, thereby determining the first layer or the second layer beam form group according to whether the position of the user is in the coverage range of the first layer or the second layer to perform the CoMP joint service for the user. As for the user at the edge of the cell, as mentioned above, when performing the coordinated service, the three beams of three cells are simultaneously used for serving the user. With layering beam groups, data of two users may be simultaneously transmitted in the same time and frequency resources, thereby achieving the object of multiplexing frequency resources and improving the data throughput.

Figure 3:
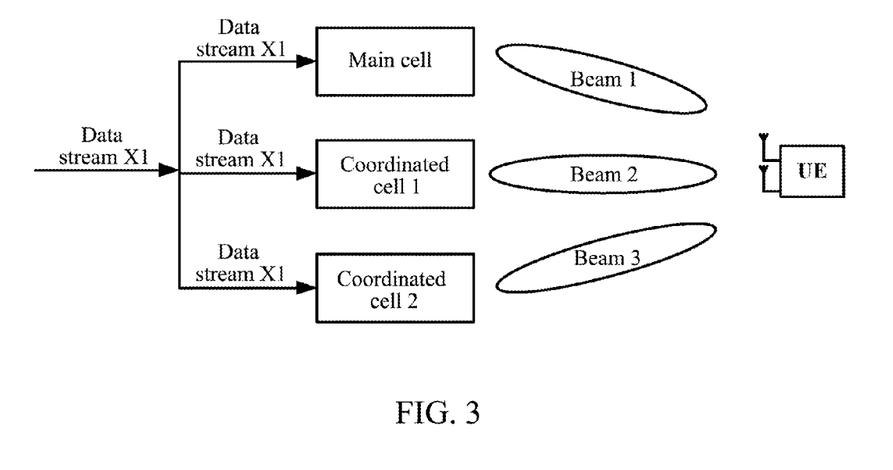
FIG. 3 is a schematic diagram of the first coordinated multiple point transmission and reception policy described in accordance with embodiments of the present invention.

FIG. 3 is a schematic diagram of the first coordinated multiple point transmission and reception policy described in accordance with embodiments of the present invention. FIG. 3 illustrates the first coordinated multiple point transmission and reception policy (CoMP service policy 1).

In the CoMP service policy 1, CoMP transmission and reception is based on one transmitting port. At this time, three cells share one transmitting port, that is to say the data transmitted by the three cells are same, represented by X1, the beam-forming weights used by various cells are different, and the beam-forming weight of each cell is determined respectively by each cell itself according to the direction of the beam in the beam group of the used layer.

The received signals in this embodiment is represented as $y=h_1B_1x_1+h_2B_2x_1+h_3B_3x_1$, wherein y represents the received signal, x1 represents the transmitted data, h represents the channel gain, and B represents the beam-forming weight.

Figure 4:
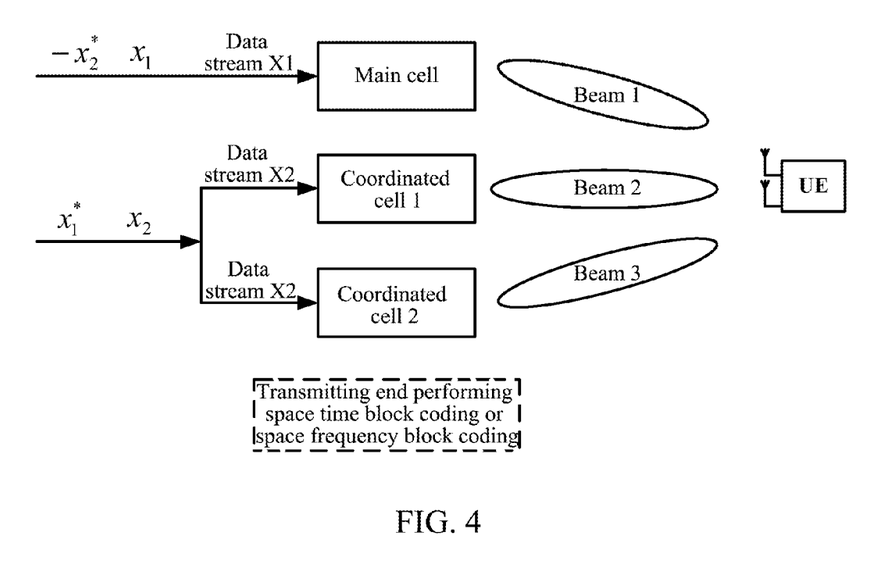
FIG. 4 is a schematic diagram of the second coordinated multiple point transmission and reception policy described in accordance with embodiments of the present invention.

FIG. 4 is a schematic diagram of the second coordinated multiple point transmission and reception policy described in accordance with the embodiment of the present invention. FIG. 4 illustrates the second coordinated multiple point transmission and reception policy (CoMP service policy 2).

In the CoMP service policy 2, CoMP transmission and reception is based on two transmitting ports. At this time, three cells may be classified into two groups, and one or more cells in the same one group transmit signals, i.e. transmit the same data stream, at the same one transmitting port after respectively being beam-form. Three cells may be divided into the main cell and the coordinated cell according to the energy analyses of received signals transmitted from every cell, wherein the energy analysis is determined according to the Channel Quality Indicator (CQI), for example the cell with the strongest energy (in other words, the best channel quality) is regarded as the main cell, and the other two cells are regarded as coordinated cells. The main cell may be regarded as a transmitting port (transmitting port 1), by which the data stream is transmitted is represented by X1 (the first kind data stream), and the rest of two coordinated cells are regarded as another transmitting port (transmitting port 2), by which the data stream is transmitted is represented by X2 (the second kind data stream).

The received signals in this embodiment is represented as $$y = h_1 B_1 x_1 + h_2 B_2 x_1 + h_3 B_3 x_1 = (H_1 H_2)\begin{pmatrix} x_1 \\ x_2 \end{pmatrix},$$

wherein the equivalent synthetic channel matrix of the transmitting port 1 is $H_1 = h_1 B_1$, and the equivalent synthetic channel matrix of the transmitting port 2 is $H_2 = h_2 B_2 + h_3 B_3$.

The equivalent synthetic channel information, i.e. the equivalent synthetic channel matrix (capital H), is used to be equivalent to the actual channel information (lowercase h). The equivalent synthetic channel matrix is introduced into the dedicated reference signal, and thus the transmitting port 1 and transmitting port 2 use different two sets of different reference signals and the dedicated reference signal information is directly loaded on the data stream.

Therefore, when receiving data stream X1 and data stream X2, the receiving end may perform equivalent channel estimation directly according to the dedicated reference signal in the two data streams, in other words, the demodulation is performed only based on the equivalent synthetic channel information (capital H) without knowing the actual channel information (lowercase h). Thereby, it is only required to make channel estimation once for all the transmitting points (various cells participating in the coordinated transmission and reception) using the set of reference signal according to this set of received reference signal and all of the transmitting points are regarded as a whole to perform transmission without differentiating the channels corresponding to every transmitting point participating in coordination. In other words, although the data streams from one transmitting port may be actually transmitted by multiple cells participating in the coordinated transmission and reception, the receiving end equivalently regards the data streams from one transmitting port as being transmitted by one transmitting antenna. The equivalent synthetic channel information makes the receiving manner of users simple and downlink control signaling less. Additionally, this is also important for the space time block coding or space frequency block coding subsequently for the reason that two-dimensional space time block coding or space frequency block coding needs two channel elements.

The transmitting point respectively analyses the received signal from the main cell and the coordinated cells according to the energy analysis of signals received from every cell, and determines the CQI value from every cell according to the received signal of each cell. If at least 2 CQI values of three CQI values are greater than the CQI threshold, policy 2 is selected to be used, or else, policy 1 is selected to be used. In other words, the policy 2 is selected and two data streams are transmitted at the same time in the case that the signal quality is relatively good; the policy 1 is selected and the same data stream is transmitted by three cells when the signal quality is poor.

In order to enhance the performance of the system and reduce the bit error rate, the space time block coding and space frequency block coding may be used for coding data. The space time block coding is taken as an example below.

As shown in FIG. 4, the transmitting process is as follows:
at time t1, data $x_1$ and $x_2$ are transmitted at two transmitting port respectively;
at time t2, data $-x_2^*$ and $x_1^*$ are transmitted at two transmitting port respectively.

The DRS reference signals (the dedicated reference signals loaded at the data streams) of different transmitting ports are different. The main cell in the three cells uses the transmitting port 1 and adopts one DRS reference signal; the two coordinated cells use the same transmitting port 2 and adopts the same DRS reference signal when transmitting the data.

At the receiving end, the user estimates the synthetic channels $H_1 = h_1 B_1$ and $H_2 = h_2 B_2 + h_3 B_3$ according to the DRS reference signals, and then performs corresponding decoding based on decoding scheme of the Space Time Block Coding (STBC) or Space Time Block Coding (SFBC). The operations of STBC and SFBC are same actually, and only one occurs in the time domain and the other occurs in the frequency domain.

Since the DRS dedicated reference signal rather than the common reference signal is used, the channel estimation of the receiving end could not detect the physical antenna at the cell side, but detect the transmitting port. In other words, the transmitting port 1 is namely the transmitting antenna 1 obtained by the channel estimation, and the transmitting port 2 is namely the transmitting antenna 1 obtained by the channel estimation.

UE (the receiving end) has two receiving antenna, namely receiving antenna 1 and receiving antenna 2.

The channel matrix obtained by the channel estimation is:

$$H = \begin{pmatrix} h_{11} & h_{12} \\ h_{21} & h_{22} \end{pmatrix},$$

wherein $k_{11}$ represents the channel gain from the transmitting port i to the receiving antenna j, wherein $k_{11}$ and $k_{12}$ are the above mentioned equivalent synthetic matrix $H_1 = h_1 B_1$ of the transmitting port 1, and $h_{21}$ and $h_{22}$ are the above mentioned equivalent synthetic matrix $H_2 = h_2 B_2 + h_3 B_3$ of the transmitting port 2.

The decoding process is as follows:
$r_1$ and $r_3$ represent receiving symbols of the receiving antenna at the first transmitting symbol interval, and $r_2$ and $r_4$ represent receiving signals of the receiving antenna at the second transmitting symbol interval:

$r_1 = h_{11}x_1 + h_{12}x_2 + n_1$ $r_2 = -h_{11}x_2^* + h_{12}x_1^* + n_2$ $r_3 = h_{21}x_1 + h_{22}x_2 + n_3$ $r_4 = -h_{21}x_2^* + h_{22}x_1^* + n_4$ and the optimal maximum likelihood decoding result are:

$\tilde{r}_1 = h^*_{11}r_1 + h_{12}r_2^* + h^*_{21}r_3 + h_{22}r_4^*$ $\tilde{r}_2 = h^*_{12}r_1 + h_{11}r_2^* + h^*_{22}r_3 - h_{21}r_4^*$ thereby decoding to obtain the transmitted data stream X1 and X2.

The present invention configures the least coordinated multiple point transmission and reception policies, and adaptively selects the transmission policy to transmit data on the basis of the channel quality value. The scheme benefits to enhance the system performance, thereby improving the data transmission performance, increasing the data throughput, and increasing the cell coverage.

The present invention is mainly with respect to the transmission in the scenario of CoMP. The implementation scheme combines features of the beam-forming with the joint processing, uses the space frequency block coding or space time block coding, and layers the beam groups. With the method of the present invention, the performance of the cell edge user and the whole system is enhanced. Meanwhile, this method for transmitting data is quite well compatible with LTE R8.

Figure 6:
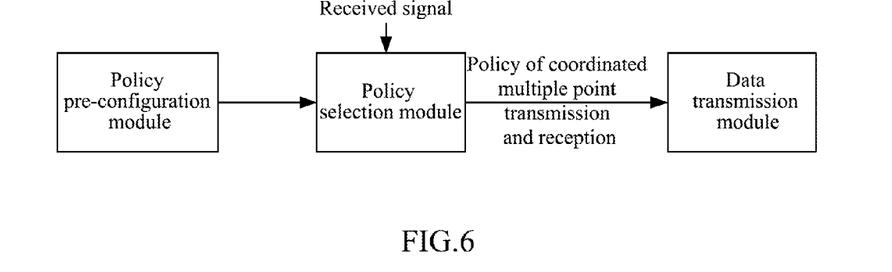
FIG. 6 is a schematic diagram of composition structure of the apparatus for transmitting data in accordance with the embodiment of the present invention.

According to the method for transmitting data of the present invention, an apparatus is provided. FIG. 6 is a schematic diagram of composition structure of the apparatus for transmitting data in accordance with the embodiment of the present invention. As shown in FIG. 6, the apparatus mainly comprises a policy pre-configuration module, a policy selection module and a data transmission module, wherein the policy pre-configuration module is used to pre-configure at least two coordinated multiple transmission and reception policies;

the policy selection module is used to determine the channel quality value of each cell based on the received signals of multiple cells participating in the coordinated transmission and reception; and select a corresponding coordinated multiple point transmission and reception policy according to the channel quality value of the cell;

the data transmission module is used to transmit the data stream to the receiving end according to the selected coordinated multiple point transmission and reception policy.

The policy pre-configuration module is specifically used to pre-configure two coordinated multiple point transmission and reception policies, wherein the first coordinated multiple point transmission and reception policy is that all of the data streams transmitted by multiple cells participating in the coordinated multiple point transmission and reception are the same; the second coordinated multiple point transmission and reception policy is that not all of the data streams transmitted by multiple cells participating in the coordinated multiple point transmission and reception are the same; correspondingly, the policy selection module is specifically used to select the second coordinated multiple point transmission and reception policy if the channel quality values of at least two cells are greater than the channel quality threshold; or else, select the first coordinated multiple point transmission and reception policy.

The beam groups obtained by the cell based on the beamforming are allocated into two layers that are not intersected, and for one receiving end, the beam group of the cell participating in the coordinated transmission and reception is located in the same layer. For one receiving end, the number of cells participating in the coordinated transmission and reception is 3, wherein the cell with the best channel quality is the main cell, and the other cells are coordinated cells; in the second coordinated multiple point transmission and reception policy, the data transmission module is specifically used to transmit the first kind data stream through the main cell, and transmit the second kind data stream through the other cells.

In the data transmission module, the main cell and the coordinated cells use space time block coding and space frequency block coding to respectively transmit the data stream.

The data transmission module is also used to load the equivalent synthetic channel information into the same data stream from the cell participating in the coordinated transmission and reception.

The above content is described in detail in combination with specific preferred embodiments, and the embodiments are examples for convenient understanding, it should not be considered that the specific embodiments of the present invention are limited to these. The person having ordinary skill in the art could make various possible equivalent changes or substitutions without departing from the inventive concept of the present invention, and such changes and substitutions shall all fall into the protection scope of the present invention.

I claim:

1. A method for transmitting data based on coordinated multiple point transmission and reception comprising:
   a transmitting point pre-configuring at least two coordinated multiple point transmission and reception policies; and
   the transmitting point determining a channel quality value of every cell according to received signals of multiple cells participating in coordinated transmission and reception; and selecting a corresponding coordinated multiple point transmission and reception policy according to the channel quality value of the cell, and transmitting a data stream to a receiving end according to the corresponding coordinated multiple point transmission and reception policy;
   wherein the coordinated multiple point transmission and reception policies pre-configured include a first coordinated multiple point transmission and reception policy and a second coordinated multiple point transmission and reception policy; and
   wherein the first coordinated multiple point transmission and reception policy refers that all of the data streams transmitted by multiple cells participating in the coordinated transmission and reception are same; the second coordinated multiple point transmission and reception policy refers that not all of the data streams transmitted by multiple cells participating in the coordinated transmission and reception are the same;
   the step of transmitting the data stream to the receiving end comprises:
   if the channel quality values of at least two cells are greater than a channel quality threshold, transmitting the data stream to the receiving end according to the second coordinated multiple point transmission and reception policy; or else, transmitting the data stream to the receiving end according to the first coordinated multiple point transmission and reception policy.

2. The method according to claim 1, wherein beam groups obtained by said cell based on beam-forming is allocated into two layers that are not intersected, and for one receiving end, the beam group of the cell participating in the coordinated transmission and reception is located in a same layer.

3. The method according to claim 2, wherein a number of cells participating in the coordinated transmission and reception is 3 for one receiving end, wherein the cell with a best channel quality is a main cell, and other cells are coordinated cells; in the second coordinated multiple point transmission and reception policy, the step of transmitting the data stream to the receiving end comprises:
   the main cell transmitting a first kind data stream, and every coordinated cell transmitting a second kind data stream.

4. The method according to claim 3, wherein the main cell and every coordinated cell uses space time block coding or space frequency block coding to transmit the data stream.

5. The method according to claim 1, wherein the step of transmitting the data stream to the receiving end further comprises: loading equivalent synthetic channel information into a same data stream from the multiple cells participating in the coordinated transmission and reception.

6. An apparatus for transmitting data based on coordinated multiple point transmission and reception comprising:

a policy pre-configuration module, which is configured to: pre-configure at least two coordinated multiple transmission and reception policies;

a policy selection module, which is configured to: determine a channel quality value of every cell based on received signals of multiple cells participating in coordinated transmission and reception; and selecting a corresponding coordinated multiple point transmission and reception policy according to the channel quality value of the cell; and a data transmission module, which is configured to: transmit a data stream to a receiving end according to the corresponding coordinated multiple point transmission and reception policy;

wherein the policy pre-configuration module is specifically configured to: pre-configured two coordinated multiple point transmission and reception policies, wherein a first coordinated multiple point transmission and reception policy refers that all of the data streams transmitted by multiple cells participating in the coordinated transmission and reception are same; and a second coordinated multiple point transmission and reception policy refers that not all of the data streams transmitted by multiple cells participating in the coordinated transmission and reception are the same; and the policy selection module is specifically configured to: select the second coordinated multiple point transmission and reception policy if the channel quality values of at least two cells are greater than a channel quality threshold; or else, select the first coordinated multiple point transmission and reception policy.

7. The apparatus according to claim 6, wherein beam groups obtained by said cell based on beam-forming is allocated into two layers that are not intersected, and for one receiving end, the beam group of the cell participating in the coordinated transmission and reception is located in a same layer.

8. The apparatus according to claim 7, wherein a number of cells participating in the coordinated transmission and reception is 3 for one receiving end, wherein the cell with a best channel quality is a main cell, and other cells are coordinated cells; in the second coordinated multiple point transmission and reception policy, the data transmission module is specifically configured to: transmit a first kind data stream through the main cell, and transmit a second kind data stream through every coordinated cell.

9. The apparatus according to claim 8, wherein in the data transmission module, the main cell and every coordinated cell use space time block coding or space frequency block coding to transmit the data stream respectively.

10. The apparatus according to claim 6, wherein the data transmission module is further configured to load equivalent synthetic channel information into a same data stream from the multiple cells participating in the coordinated transmission and reception.

11. The method according to claim 1, wherein the step of transmitting the data stream to the receiving end further comprises: loading equivalent synthetic channel information into a same data stream from the multiple cells participating in the coordinated transmission and reception.

12. The method according to claim 2, wherein the step of transmitting the data stream to the receiving end further comprises: loading equivalent synthetic channel information into a same data stream from the multiple cells participating in the coordinated transmission and reception.

13. The method according to claim 3, wherein the step of transmitting the data stream to the receiving end further comprises: loading equivalent synthetic channel information into a same data stream from the multiple cells participating in the coordinated transmission and reception.

14. The method according to claim 4, wherein the step of transmitting the data stream to the receiving end further comprises: loading equivalent synthetic channel information into a same data stream from the multiple cells participating in the coordinated transmission and reception.

15. The apparatus according to claim 6, wherein the data transmission module is further configured to load equivalent synthetic channel information into a same data stream from the multiple cells participating in the coordinated transmission and reception.

16. The apparatus according to claim 7, wherein the data transmission module is further configured to load equivalent synthetic channel information into a same data stream from the multiple cells participating in the coordinated transmission and reception.

17. The apparatus according to claim 8, wherein the data transmission module is further configured to load equivalent synthetic channel information into a same data stream from the multiple cells participating in the coordinated transmission and reception.

18. The apparatus according to claim 9, wherein the data transmission module is further configured to load equivalent synthetic channel information into a same data stream from the multiple cells participating in the coordinated transmission and reception.

* * * * *